(12) United States Patent
Singh et al.

(10) Patent No.: US 8,898,734 B2
(45) Date of Patent: Nov. 25, 2014

(54) ANALYZING SECURITY COMPLIANCE WITHIN A NETWORK

(75) Inventors: Pradeep K. Singh, Arlington, VA (US);
Ankit Agarwal, Bethesda, MD (US);
Alain J. Cohen, Washington, DC (US);
Venuprakash Barathan, Chevy Chase, MD (US); Vinod Jeyachandran, Rockville, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 2579 days.

(21) Appl. No.: 11/505,171

(22) Filed: Aug. 16, 2006

(65) Prior Publication Data

US 2007/0157286 A1 Jul. 5, 2007

Related U.S. Application Data

(60) Provisional application No. 60/709,725, filed on Aug. 20, 2005, provisional application No. 60/803,765, filed on Jun. 2, 2006.

(51) Int. Cl.
*H04L 29/06* (2006.01)
*H04L 12/26* (2006.01)
*H04L 12/24* (2006.01)

(52) U.S. Cl.
CPC .............. *H04L 41/28* (2013.01); *H04L 63/1433* (2013.01); *H04L 12/2697* (2013.01); *H04L 63/20* (2013.01); *H04L 41/22* (2013.01); *H04L 43/50* (2013.01); *H04L 41/0893* (2013.01); *H04L 41/0866* (2013.01); *H04L 41/145* (2013.01)
USPC ................... 726/3; 726/25; 726/27; 713/151; 370/235

(58) Field of Classification Search
USPC ............ 370/235; 713/151, 152; 726/3, 25, 27
See application file for complete search history.

(56) References Cited

U.S. PATENT DOCUMENTS 6,993,448 B2 * 1/2006 Tracy et al. .................... 702/119

OTHER PUBLICATIONS

Disparate Network Model Synchronization; George et al.; filed Aug. 9, 2006.
Incremental Update of Virtual Devices in a Modeled Network; Singh et al; filed Aug. 11, 2006.
U.S. Appl. No. 60/803,765, filed Jun. 2, 2006, Barathan et al.

* cited by examiner

*Primary Examiner* — Eleni Shiferaw
*Assistant Examiner* — Paul Callahan
(74) *Attorney, Agent, or Firm* — Park, Vaughan, Fleming & Dowler LLP

(57) ABSTRACT

A security policy database identifies the intended security policies within a network, a traffic generator provides test traffic that is configured to test each defined security policy, and a simulator simulates the propagation of this traffic on a model of the network. The model of the network includes the configuration data associated with each device, and thus, if devices are properly configured to enforce the intended security policies, the success/failure of the simulated test traffic will conform to the intended permit/deny policy of each connection. Differences between the simulated message propagation and the intended security policies are reported to the user, and diagnostic tools are provided to facilitate identification of the device configuration data that accounts for the observed difference. Additionally, if a network's current security policy is unknown, test traffic is generated to reveal the actual policy in effect, to construct a baseline intended security policy.

18 Claims, 2 Drawing Sheets

| Zone A | Zone B | Direction | Scan? | Expected | |
|---|---|---|---|---|---|
| Enterprise | DMZ_1 | BiDirectional | Yes | Permit | 251 |
| Enterprise | DMZ_2 | A to B | Yes | Permit | 252 |
| Enterprise | DMZ_2 | B to A | Yes | Deny | 253 |
| Enterprise | DMZ_3 | BiDirectional | No | n/a | 254 |
| DMZ_1 | DMZ_2 | BiDirectional | Yes | Permit | 255 |
| DMZ_1 | DMZ_3 | BiDirectional | Yes | Deny | |
| DMZ_2 | DMZ_3 | BiDirectional | Yes | Deny | |

200

ANALYZING SECURITY COMPLIANCE WITHIN A NETWORK

This application claims the benefit of U.S. Provisional Patent Application 60/709,725, filed 20 Aug. 2005, and 60/803,765, filed 2 Jun. 2006.

BACKGROUND AND SUMMARY OF THE INVENTION

This invention relates to the field of network management, and in particular to a method and system for analyzing and verifying compliance with security policies among devices in a network.

Network security is a continuing concern among network users and network managers. In a secure computer network, to prevent unauthorized access to the network, only a specified set of systems, services, and applications are permitted to use the network. Additionally, within a network, not all systems, services, and applications are permitted to communicate with each other. The term 'security policy' is used to identify the connections that should be permitted or denied between network elements.

Certain devices within a network, such as routers and firewalls, can be configured to enforce security policies within the network, and complex security policies may require that multiple devices be compatibly configured.

Verifying that each device in a network is properly configured to effect the intended security policies is a daunting task, particularly in complex networks that include multiple communication paths among network elements. This task is further complicated by the fact that different devices may use different schemes for effecting the same security policy. A security analyst must typically be aware of a variety of vendor-dependent configuration formats and protocols, and must be aware of each configuration setting's effect on the security policy of each connection to the device.

Often, security policy analysis and verification is a 'hit or miss' process, with minimal analytical basis. A security analyst reviews configuration settings, corrects any obvious security loopholes, and then verifies security by attempting to send messages to or from a variety of elements on the network. If a message traverses a denied connection, or is blocked from a permitted connection, the cause of the error is determined, the configuration is modified, and the test is repeated.

It is an objective of this invention to provide a method and system for identifying and verifying compliance with security policies within a network. It is a further objective of this invention to provide a method and system for identifying network configuration data that is inconsistent with intended security policies.

These objectives, and others, are achieved by a method and system that uses a security policy database that identifies the intended security policies within a network to generate test traffic that is configured to test each defined security policy, and simulates the propagation of this traffic on a model of the network. The model of the network includes the configuration data associated with each device, and thus, if devices are properly configured to enforce the intended security policies, the success/failure of the simulated test traffic will conform to the intended permit/deny policy of each connection. Differences between the simulated message propagation and the intended security policies are reported to the user, and diagnostic tools are provided to facilitate identification of the device configuration data that accounts for the observed difference. Additionally, if a network's current security policy is unknown, test traffic is generated to reveal the actual policy in effect, to construct a baseline intended security policy.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. The invention is presented herein using an example IP (Internet Protocol) based network paradigm, even though one of ordinary skill in the art will recognize that the principles of this invention are not limited to the use of any particular protocol or network structure. For purposes of simplicity and clarity, detailed descriptions of well-known devices, circuits, and methods are omitted so as not to obscure the description of the present invention with unnecessary detail.

Figures 1, 2:
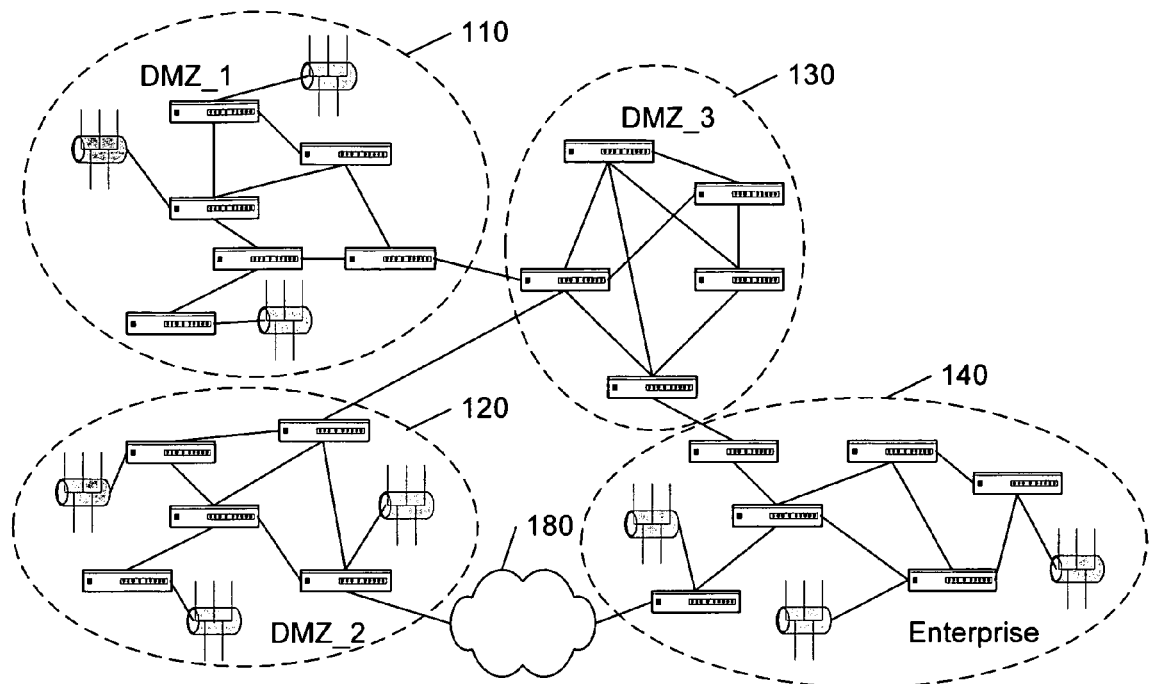
FIG. 1 illustrates an example network diagram.
FIG. 2 illustrates example contents of a security policy database in accordance with this invention.

FIG. 1 illustrates an example network diagram that illustrates a network that includes four zones DMZ_1 110, DMZ_2 120, DMZ_3 130, and Enterprise 140. These zones include any of a variety of systems, services, applications, and so on, hereinafter termed network elements. These network elements are generally able to communicate with other elements throughout the network, and some of these elements, hereinafter termed access devices, are configurable to selectively block such communications. Such access devices include, for example, routers and firewalls, and may be provided as discrete devices, components of a multi-purpose device, including hardware or software components, or a combination of both. The 'cloud' 180 serves to illustrate a means of communicating between zones DMZ_2 120 and Enterprise 140 for which the internal details are unknown, such as an Internet connection.

In an IP-based network, network elements use a variety of transport protocols, such as TCP and UDP to transport electronic data between each other. Transport protocols provide service through service access points called ports. The pair of IP address and port number provides a unique address of each network element and is called a socket. Systems that need to communicate with each other open connections to each other's sockets. Security policies are generally specified across a range of allowable IP addresses, protocols, and ports. In the example of FIG. 1, the zone 'Enterprise' is definable by a set of IP addresses that define each of the elements within the zone; similar sets of addresses define each of the other zones.

In the context of this invention, the creation/definition of a zone facilitates the definition of intended security policies. Instead of having to define each network element's security policy relative to each and every other network element, security policies can be defined between groups of network elements, herein defined as zones. A zone may contain as few as one network element, and thus this grouping of elements does not constrain a user's ability to define individual security policies for each element, if desired. That is, the user is given the flexibility to define security policies in a spectrum from a single IP address, to a range of IP addresses, to multiple IP address ranges.

FIG. 2 illustrates an example collection/database 200 of security policies for the network of FIG. 1. The first two columns 210, 220 identify a pair of zones; the third column 230 indicates the direction for which the security policy for this pair applies; and the fifth column 250 indicates the intended policy. In this example, the security policy between elements in the Enterprise zone (column 210) and the DMZ_1 zone (column 220) is to permit 251 communications between these zones in either direction (column 230). The security policy between Enterprise and DMZ_2, on the other hand, permits 252 communications from Enterprise to DMZ_2, but prohibits/denies 253 communications from DMZ_2 to Enterprise.

One of ordinary skill in the art will recognize that the form of the security policy database is immaterial to the principles of this invention, as is the use of 'named' zones. A simple list of IP addresses or IP address ranges that are permitted to, or prohibited from, communicating with each other may also be used. In like manner, as discussed further below, a user may not know the security policy between zones, and may create lists of IP addresses or address ranges for which a determination of the security policy is requested.

Any of a variety of techniques may be used to identify zones and to create the database of security policies corresponding to these zones. For example, a graphics user interface may be provided that allows a user to identify each zone on a network diagram. In a simpler embodiment, the user may create a list of sets of address, protocol, and port ranges that define each of the zones. As noted above, the zones are defined so as to facilitate the creation/definition of security policies between each pair of zones; as such, each of the elements within each zone should have the same security policy relative to each other zone. Copending U.S. patent application 60/803,765, "SYSTEM AND METHOD FOR COMPREHENSIVE NETWORK ANALYSIS ON RANGES OF TRAFFIC FLOWS", filed 2 Jun. 2006 for Barathan et al., teaches a technique for automating the identification of network elements that share common properties, such as a common security policy, and is incorporated by reference herein. Optionally, an exhaustive analysis can be used to discover the de-facto security policy. In many cases, users may not know their current security policy, and discovering it manually is impractical or infeasible, particularly in large operational networks. The results of an exhaustive analysis include a list of all the IP addresses, ports, and protocols in the network, or portions of the network, as well as indications of whether each connection is permitted or denied. These results can then easily be transformed into a new database of security policies.

In accordance with an aspect of this invention, a security policy validation system is configured to process the list of security policies for the network, check for inconsistencies or conflicts, and verify that the access devices in the network are properly configured to enforce each security policy. In a preferred embodiment, the user is provided the option of selecting 240 which security policies to verify. In the example of FIG. 2, the security policy between Enterprise and DMZ_3 is identified as a policy that is not to be verified, at 244. DMZ_3 may be, for example, a collection of network elements for which the security policy 254 is unknown and/or of no interest to the user.

Figures 3, 4:
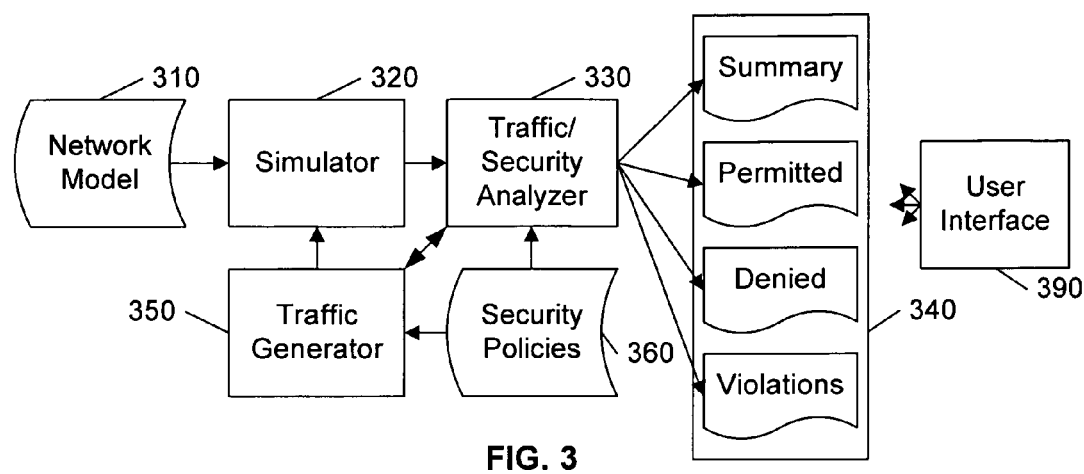
FIG. 3 illustrates an example security policy validation system in accordance with this invention.
FIG. 4 illustrates example outputs from a security policy validation system in accordance with this invention.

FIG. 3 illustrates an example block diagram of a security policy validation system. In a preferred embodiment of this invention, a network simulator 320 is used to simulate the operation of the network, including the operation of each access device in the network in accordance with its current configuration. A user interface 390 is provided to facilitate control of the system by a user, and to provide a display of the output(s) from the system.

Using techniques known in the art, a network model 310 provides the configuration information that is necessary to model the network and each of the access devices. Typically, each access device on the network is queried, and in response, the device transmits its current configuration for use in creating the model 310.

In accordance with this invention, a traffic generator 350 generates traffic that tests and/or determines the specified security policies 360 for this network, and the network simulator 320 simulates this traffic flow across the modeled network 310. By simulating a model of the network, messages that test the security policies can be simulated and the results evaluated without impacting the performance of the actual network. Assuming that the network model 310 is an accurate representation of the actual network, and assuming that the network simulator 320 accurately models traffic flow through this modeled network, the enforcement or lack of enforcement of intended security policies can be accurately determined. Additionally, the use of a simulator allows a user to simulate fault conditions on the network, to verify that the security policies are enforced under a variety of routing circumstances. The use of a simulation system also facilitates determining the effects of new or proposed changes on the security policies of the network. Copending U.S. patent application Ser. No. 11/501,389, "DISPARATE NETWORK MODEL SYNCHRONIZATION", filed 9 Aug. 2006 for George et al., teaches techniques for updating network models as changes occur, and is incorporated by reference herein. Copending U.S. patent application Ser. No. 11/503,553, "INCREMENTAL UPDATE OF VIRTUAL DEVICES IN A MODELED NETWORK", filed 11 Aug. 2006 for Singh et al., (now U.S. Pat. No. 7,693,699 issued on 6 Apr. 2010), teaches techniques for incrementally updating a network model as changes occur or are proposed, and is incorporated by reference herein.

A security analyzer 330 processes the results of the simulation of this security-policy-testing traffic flow through the modeled network, compares these results to the intended security policies in the security policies database 360, and provides a security policy report 340. Typically, the security analyzer 330 and the traffic generator 350 are integrally coupled, for efficient test-traffic generation and evaluation, but are illustrated in FIG. 3 as separate components for ease of understanding.

The traffic generator 350 and security analyzer 330 are configured to test each security policy selected by the user for verification (column 240 of FIG. 2). As noted above, the security policies are specified for application between pairs of source-destination zones, wherein each zone may include a range of IP addresses, protocols, and ports. In a straightforward embodiment of this invention, the traffic generator 350 generates a message for each IP address, protocol, and port within the range of each source zone, for transmission to each IP address, protocol, and port within the range of each destination zone. The security analyzer 330 notes which messages from each source arrive or do not arrive at each destination, and compares the arrival/non-arrival to the permit/deny security policy.

If a violation is detected, i.e. an arrival over a denied connection, or a non-arrival over a permitted connection, it is reported to the user. In a preferred embodiment of this invention, the network simulator 320 and security analyzer 330 are configured to enable a user to diagnose each violation. That is, for example, the user is provided the opportunity to trace the path of the propagation of the message from the source to its termination at either the destination or at a blocking access device. The path of each message may be stored during the simulation, to facilitate this path tracing, or a re-simulation of the message that effected the violation may be performed to allow an interactive diagnosis of the path of that particular message. The security analyzer 330 may be configured to automate a variety of such diagnostic tasks, such as automatically providing the path of all violating-messages, automatically identifying the blocking device that caused a non-arrival over a permitted connection, and so on.

In a preferred embodiment of this invention, the aforementioned exhaustive generation of test messages for each pair of IP addresses, protocols, and ports that provides a connection between a source and destination zone is avoided, using techniques such as taught in the aforementioned copending U.S. patent application entitled "SYSTEM AND METHOD FOR COMPREHENSIVE NETWORK ANALYSIS ON RANGES OF TRAFFIC FLOWS". These techniques are based on the observation that the configuration of an access device is generally specified in terms of ranges of IP addresses, protocols, and ports, and, assuming that the access device is operating properly, the testing of a single element in each range is sufficient to determine the security policy for all of the elements in that range.

In this preferred embodiment of the invention, the security analyzer 330 and traffic generator 350 are configured to assess the configuration of each access device along the path between a source and destination zone, to determine ranges that apply across the entire path. Within each determined range, a single message is generated by the traffic generator 350, and the results of its propagation through the modeled network is used by the security analyzer 330 to determine the security policy for the entire range. For example, if none of the access devices along the path contain a limitation/denial based on the port address, the transmission of a single message along this path, addressed to any port, is sufficient to determine the security policy for all of the ports. In like manner, if each of the access devices include an IP address range of "10.1.2.0-10.1.2.200", a single message addressed to any address within the range of 10.1.2.0 and 10.1.2.200 is sufficient to verify the security policy of all of the addresses within this range.

The security analyzer 330 in the example embodiment of FIG. 3 provides four output reports, a summary report, a report of permitted connections, a report of denied connections, and a report of violations. The summary report may take the form of the example in FIG. 4, wherein an "Actual" column 450 is added to the security policies database. As noted above, the particular form of the input or output report is immaterial to the principles of the invention, and may include, for example, specific IP addresses, ports, and protocols in lieu of, or in addition to, the named zones.

Simulated security policies that are consistent with the expected security policy of column 250 are reported as such in column 450. Simulated security policies that differ from the expected security policy are indicated by a link 453, 455 to another page that provides the details to facilitate diagnostics, as discussed above. That is, for example, on the third row that indicates that communications from Enterprise to DMZ_2 are expected to be denied 253, a 'click here' icon 453 is displayed, indicating that at least one message reached DMZ_2 from Enterprise. Clicking on the icon 453 provides the user with a list of the messages that reached DMZ_2 from Enterprise, and an indication of the path that allowed these messages to reach DMZ_2. In like manner, the 'click here' icon 455 indicates that at least one message did not reach DMZ_2 from DMZ_1 although all communications were expected to be permitted 255. Clicking on this icon 455 provides the user with a list of the messages that were blocked, along with an identification of the access device that caused the block. In a preferred embodiment, each of the entries in column 450 are 'clickable' to obtain details regarding the simulation of the messages that provided the 'permit', 'deny', or 'violation' determinations. The violations report is similar to the summary report, except that it includes only the violations, and is particularly useful in large networks with extensive security policies.

As noted above, the principles of this invention may be used to identify existing security policies, independent of expected policies. That is, for example, the 'expected' column 250 may include one or more blanks, and the security analyzer can be configured to fill in column 450 with 'permitted', 'denied', or 'mixed', the 'mixed' determination indicating that some messages were permitted and others denied. Each of these determinations can likewise lead to other pages that provide details regarding the messages, as discussed above.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although this invention is particularly well suited for use with a simulated network model, one of ordinary skill in the art will recognize that the traffic generator 350 and security analyzer 330 can be configured to generate actual messages that are to be communicated via the actual network, and the receipt or non-receipt of these messages at actual network elements can be used to verify the security policies between zones. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:
   identifying, on a security validation system, one or more pairs of zones of a network, each element of a first zone of each pair having a common security policy relative to each element of a second zone of the pair,
   selecting, by the security validation system, at least one pair of the pairs of zones,
   generating, by the security validation system, one or more messages for transmission between a source zone and a destination zone of the at least one pair, and
   determining, by the security validation system, the security policy corresponding to the at least one pair of zones based on propagation of the one or more messages from the source zone toward the destination zone.

2. The method of claim 1, wherein determining the security policy includes simulating the propagation of the one or more messages based on a model of the network.

3. The method of claim 2, including determining whether the security policy corresponding to the at least one pair of zones is consistent with an expected security policy associated with the at least one pair, based on the propagation of the one or more messages.

4. The method of claim 3, including facilitating diagnosis of violations of the expected security policy.

5. The method of claim 4, including:
   based on the propagation, identifying one of:
      a path corresponding to the propagation of at least one of the one or more messages between the source and destination zones, and
      one or more network devices that blocked the propagation of the at least one message to the destination zone.

6. The method of claim 1, including determining whether the security policy corresponding to the at least one pair of zones based on the propagation of the one or more messages between the zones is consistent with an expected security policy for the at least one pair of zones.

7. The method of claim 6, including facilitating diagnosis of violations of the expected security policy.

8. The method of claim 1, including identifying a path corresponding to the propagation of at least one of the one or more messages between the source and destination zones.

9. The method of claim 1, including identifying one or more network devices that blocked the propagation of the at least one message to the destination zone.

10. The method of claim 1, including displaying information regarding the security policy corresponding to the at least one pair of zones.

11. The method of claim 1, wherein the information includes an identification of whether a connection was permitted or denied between the first zone and the second zone of at least one pair, based on the propagation.

12. The method of claim 10, wherein the information includes an identification of whether an expected security policy of the at least one pair of zones was violated, based on the propagation.

13. The method of claim 10, wherein the information includes a path corresponding to the propagation of at least one of the one or more messages between the source and destination zones, based on the propagation.

14. The method of claim 10, wherein the information includes a first report that identifies the security policy for a plurality of the one or more pairs, based on the propagation.

15. The method of claim 14, wherein the information includes a second report that identifies each of the one or more pairs in which communication was denied between the first zone and the second zone, based on the propagation.

16. The method of claim 15, wherein the information includes a third report that identifies each of the one or more pairs in which communication was permitted between the first zone and the second zone, based on the propagation.

17. The method of claim 16, wherein the information includes a fourth report that identifies each of the one or more pairs in which an expected security policy was violated, based on the propagation.

18. The method of claim 10, wherein the information includes a report that identifies each of the one or more pairs in which an expected security policy was violated, based on the propagation.

* * * * *